United States Patent
Rodney

(10) Patent No.: US 9,720,126 B2
(45) Date of Patent: Aug. 1, 2017

(54) MAGNETIC SENSING APPARATUS HAVING A HELMHOLTZ COIL

(75) Inventor: Paul F. Rodney, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 22 days.

(21) Appl. No.: 14/370,518

(22) PCT Filed: Jan. 19, 2012

(86) PCT No.: PCT/US2012/021875
§ 371 (c)(1),
(2), (4) Date: Jul. 3, 2014

(87) PCT Pub. No.: WO2013/109278
PCT Pub. Date: Jul. 25, 2013

(65) Prior Publication Data
US 2014/0340089 A1  Nov. 20, 2014

(51) Int. Cl.
*G01V 3/28* (2006.01)
*G01V 3/40* (2006.01)
(Continued)

(52) U.S. Cl.
CPC ............... *G01V 3/28* (2013.01); *E21B 47/12* (2013.01); *G01V 3/34* (2013.01); *G01V 3/40* (2013.01)

(58) Field of Classification Search
CPC ... G01V 3/28; G01V 3/34; G01V 3/40; G01V 3/32; G01V 3/082; G01V 3/165;
(Continued)

(56) References Cited

U.S. PATENT DOCUMENTS

| | | |
|---|---|---|
| 3,398,360 A | 8/1968 | Behr et al. |
| 3,691,363 A | 9/1972 | Armistead |

(Continued)

FOREIGN PATENT DOCUMENTS

| | | |
|---|---|---|
| RU | 2390803 C2 | 5/2010 |
| WO | WO-2008149957 A2 | 12/2008 |
| WO | WO-2011/071244 A2 | 6/2011 |
| WO | WO-2013109278 A1 | 7/2013 |

OTHER PUBLICATIONS

"Advanced Optically-driven Spin Precession Magnetometer for ASW", U. S. Navy Document STTR FY2004, Proposal No. N045-002-0311, Palatomic, Inc., 1810 N. Glenville Drive, Richardson, TX 75081-1954, (2004), 1 pg.

(Continued)

*Primary Examiner* — Vinh Nguyen
(74) *Attorney, Agent, or Firm* — Gilliam IP PLLC

(57) ABSTRACT

In some embodiments, an apparatus and a system, as well as a method and an article, may operate to acquire a first signal from a first magnetometer at least partially disposed within a Helmholtz coil, to acquire a second signal from a second magnetometer having a sensitivity at least one thousand times less than the first magnetometer, to process the second signal to determine a drive signal, to drive the Helmholtz coil using the drive signal so as to null an ambient Earth magnetic field surrounding the first magnetometer, and to process the first signal as one of a down hole location signal or a down hole telemetry signal, the location signal to determine a range to a sub-surface object, and the telemetry signal to provide data from down hole drilling operations. Additional apparatus, systems, and methods are disclosed.

21 Claims, 9 Drawing Sheets

(51) Int. Cl.
 *E21B 47/12* (2012.01)
 *G01V 3/34* (2006.01)
(58) Field of Classification Search
 CPC .............. G01V 3/26; G01N 33/54326; G01R
 33/0017; G01R 33/04; G01R 33/307;
 G01R 33/3692; G01R 33/0035; G01R
 33/1215; G06F 17/3024
 See application file for complete search history.

(56) References Cited

U.S. PATENT DOCUMENTS

| | | | |
|---|---|---|---|
| 4,071,815 | A | 1/1978 | Zemanek, Jr. et al. |
| 4,323,848 | A | 4/1982 | Kuckes |
| 4,372,398 | A | 2/1983 | Kuckes |
| 4,443,762 | A | 4/1984 | Kuckes |
| 4,529,939 | A | 7/1985 | Kuckes |
| 4,700,142 | A | 10/1987 | Kuckes |
| 4,791,373 | A | 12/1988 | Kuckes |
| 5,367,221 | A | 11/1994 | Santy et al. |
| 5,519,318 | A * | 5/1996 | Koerner ............. G01R 33/0206 324/247 |
| 6,242,907 | B1 | 6/2001 | Clymer et al. |
| 6,429,784 | B1 | 8/2002 | Beique et al. |
| 6,472,869 | B1 | 10/2002 | Upschulte et al. |
| 6,657,597 | B2 | 12/2003 | Rodney et al. |
| 6,781,521 | B1 | 8/2004 | Gardner et al. |
| 7,038,450 | B2 | 5/2006 | Romalis et al. |
| 7,145,333 | B2 | 12/2006 | Romalis et al. |
| 7,212,132 | B2 | 5/2007 | Gao |
| 7,219,748 | B2 | 5/2007 | Gao et al. |
| 7,268,696 | B2 | 9/2007 | Rodney et al. |
| 7,573,264 | B2 | 8/2009 | Xu et al. |
| 7,656,154 | B2 | 2/2010 | Kawabata et al. |
| 7,686,099 | B2 | 3/2010 | Rodney |
| 7,826,065 | B1 | 11/2010 | Okandan |
| 2009/0030615 | A1 | 1/2009 | Clark |
| 2010/0005313 | A1 | 1/2010 | Dai |
| 2010/0225313 | A1 | 9/2010 | Blanz |
| 2012/0310581 | A1 | 12/2012 | Ryu |

OTHER PUBLICATIONS

"European Application Serial No. 12865988.5, Amendment filed Jul. 29, 2014", 16 pgs.
"International Application Serial No. PCT/US2012/021875, International Preliminary Report on Patentability mailed Nov. 12, 2014", 9 pgs.
"Rotation matrix", [online]. Wikipedia®. [archived on Nov. 30, 2010] Retrieved from the Internet: <URL: https://web.archive.org/web/20101130023131/http://en.wikipedia.org/wiki/Rotation_matrix>, (2010), 14 pgs.
"The Spin Exchange Relaxation Free (SERF) Magnetometer", [online ]. [archived on Jul. 16, 2010]. Retrieved from the Internet: <URL: https://web.archive.org/web/20100716202152/http://physics.princeton.edu/romalis/magnetometer/>, (2010), 4 pgs.
Kominis, I. K., et al., "A subfemtotesla multichannel atomic magnetometer", *Nature*, 422, (2003), 596-599.
Schwindt, Peter D. D., et al., "Chip-scale atomic magnetometer with improved sensitivity by use of the Mx technique", *Applied Physics Letters*, 90, 081102, (2007), 3 pgs.
"European Application Serial No. 12865988.5, Office Action mailed Jan. 12, 2015", 1 pg.
"European Application Serial No. 12865988.5, Supplementary European Search Report mailed Dec. 22, 2014", 7 pgs.
"European Application Serial No. 12865988.5, Response filed May 18, 2015 to Extended European Search Report mailed Dec. 22, 2014", 14 pgs.
"International Application Serial No. PCT/US2012/021875, Response filed May 15, 2013 to Written Opinion mailed May 23, 2012", 4 pgs.
"Russian Application Serial No. 2014133909, Office Action mailed Jul. 31, 2015", (w/ English Translation), 24 pgs.
"Russian Application Serial No. 2014133909, Response filed Sep. 4, 2015 to Office Action mailed Jul. 31, 2015", (w/ English Translation of Amended Claims), 8 pgs.
"International Application Serial No. PCT/US2012/021875, Search Report mailed May 23, 2012", 2 pgs.
"International Application Serial No. PCT/US2012/021875, Written Opinion mailed May 23, 2012", 6 pgs.
Kitching, J., et al., "Chip-Scale Atomic Devices: Precision Atomic Instruments Based on Mems", Proceedings, Symposium Frequency Standards and Metrology, (2008), 445-453.
Preusser, J., et al., "A microfabricated photonic magnetometer", Proceedings, IEEE Sensors, (2008), 3 pgs.
Taylor, J. M., et al., "High-sensitivity diamond magnetometer with nanoscale resolution", Nature Physics, 4, (Oct. 2008), 810-816.
"Canadian Application Serial No. 2,861,152, Office Action mailed Feb. 25, 2016", 4 pgs.
"European Application Serial No. 12865988.5, Communication pursuant to Article 94(3) EPC mailed Sep. 23, 2015", 4 pgs.
"European Application Serial No. 12865988.5, Response filed Jan. 6, 2016 to Communication pursuant to Article 94(3) EPC mailed Sep. 23, 2015", 4 pgs.
"European Application Serial No. 12865988.5, Summons to Attend Oral Proceedings mailed Jul. 4, 2016", 3 pgs.
Mioara, Mandea, et al., "Instruments and methodologies for the measurement of the earth's magnetic field", Geomagnetic Observations and models/ ed. Mioara mandea; monika korte,Dordrecht [u.a.] : springer, 2011, NL XP008180511 ISBN: 978-90-481-9857-3, (Jan. 1, 2010), 105-126.
"Canadian Application Serial No. 2,861,152. Amendment filed Aug. 23, 2016 in response to Office Action mailed Feb. 25, 2016", 48 pgs.

* cited by examiner

MAGNETIC SENSING APPARATUS HAVING A HELMHOLTZ COIL

PRIORITY APPLICATION

This application is a U.S. National Stage Filing under 35 U.S.C. 371 from International Application No. PCT/US2012/021875, filed on 19 Jan. 2012, and published as WO 2013-109278 A1 on 25 Jul. 2013; each of the application and the publication is incorporated herein by reference in its entirety.

BACKGROUND

Understanding the structure and properties of geological formations can reduce the cost of drilling wells for oil and gas exploration. Measurements made in a borehole (i.e., down hole measurements) are typically performed to attain this understanding, to identify the composition and distribution of material that surrounds the measurement device down hole. To obtain such measurements, magnetometers are sometimes applied to provide telemetry, ranging, and bit location functions.

Magnetometers with increased sensitivity have recently become available. For example, some references for Rb atomic vapor magnetometers quote sensitivities on the order of 10 $fT/Hz^5$. These units may be able to provide greater telemetry bandwidth, and more precise location, than magnetometers currently in use down hole. However, to operate these units within the Earth's magnetic field, in applications where a bandwidth of 30 Hz or more is desired, a resolution on the order of 27 bits may be needed. If electronic devices with a voltage range of ±12 VDC are used to process these signals, then the desired resolution is equivalent to roughly 90 nanovolts. For this reason, it is extremely difficult to manufacture processing electronics with a noise floor that permits useful operation of these sensors under down hole conditions.

DETAILED DESCRIPTION

Figure 1:
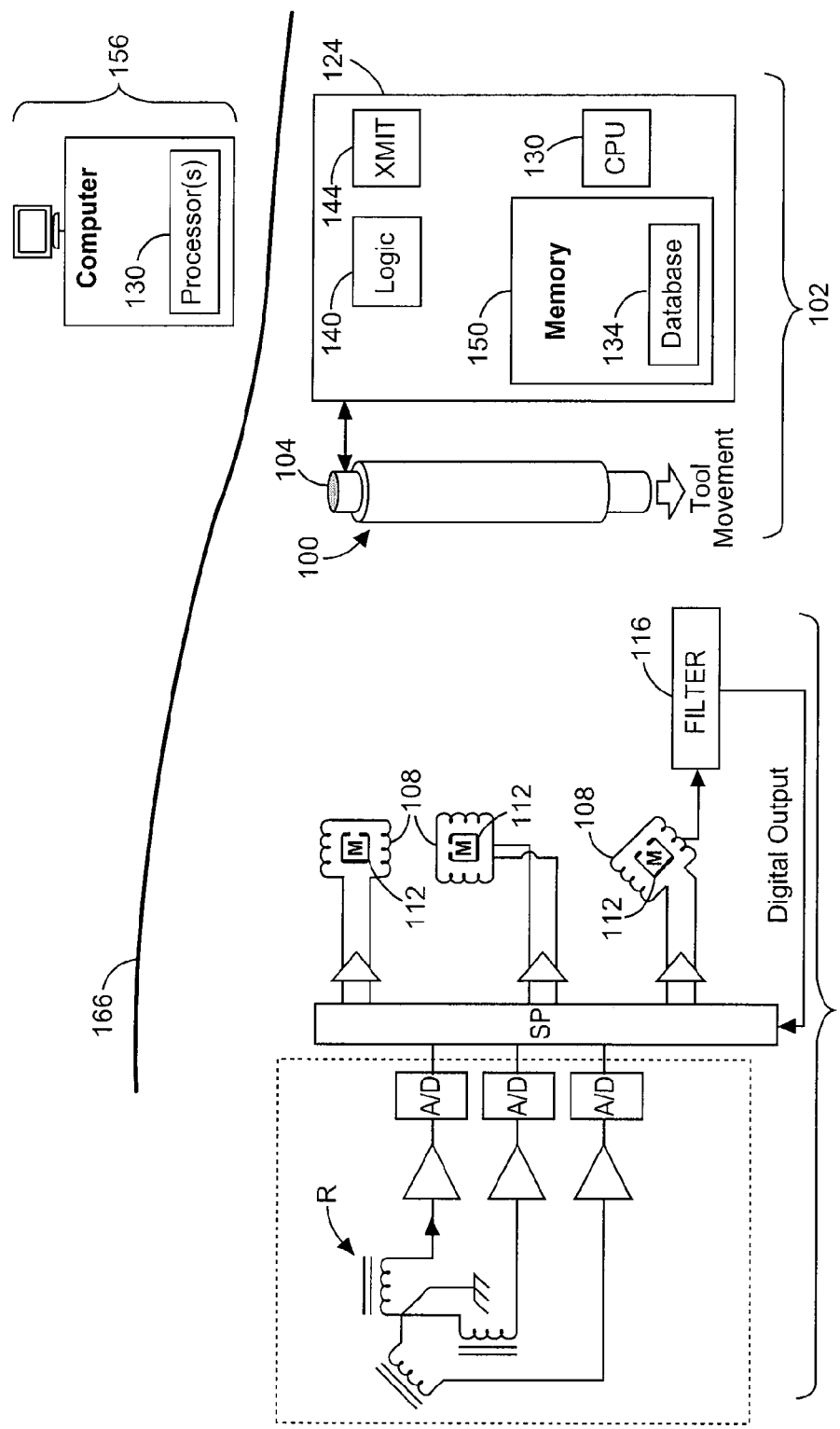
FIG. 1 is a block diagram of apparatus and systems according to various embodiments of the invention.

To address some of the challenges described above, as well as others, apparatus, systems, and methods are described herein for using magnetometers with relatively high sensitivity in down hole telemetry and location applications.

To begin, one may consider the use of these devices in electromagnetic (EM) telemetry surface receivers, EM measurements, magnetic or EM ranging, and bit location applications. To make use of the attainable sensitivity, operating these magnetometers with a 30 Hz bandwidth in the Earth's magnetic field (having a nominal value of 50,000 nT) yields the range of resolution requirements shown in Table I.

TABLE I

| Bits needed for 10 $fT/Hz^5$ sensitivity | Range needed for 2.6 $pT/Hz^5$ sensitivity | Range needed for 40 $pT/Hz^5$ sensitivity |
|---|---|---|
| 27 bits | 22 bits | 18 bits |

In most cases, these requirements would be impractical to implement. For example, if one assumes the use of electronic devices operating over a range of ±12 VDC to process these signals, then the desired resolution would be as shown in Table II.

TABLE II

| Resolution for 10 $fT/Hz^5$ sensitivity | Resolution for 2.6 $pT/Hz^5$ sensitivity | Resolution for 40 $pT/Hz^5$ sensitivity |
|---|---|---|
| 90 nanovolts | 3 microvolts | 46 microvolts |

Resolution on the order shown in Table II, especially down hole, is impractical because producing electronics with a suitable noise floor, without removing the ambient field, is extremely difficult. However, if the ambient field can be removed in a cost-effective manner, down hole operations become possible.

To remove the ambient field, Helmholtz coils of different designs can be employed, along with shielding materials (e.g., mu metal). In some cases, shielding materials are less useful than in others, such as when the field from an Earth formation or another borehole is to be sensed.

Properly configured, high sensitivity magnetometers can be used down hole for EM telemetry, ranging to metal (particularly magnetic) objects, and in determining the location of a drill bit. Unlike SQUIDs (superconducting quantum interference devices), which are operated in a cryogenic environment, atomic vapor magnetometer devices can operate at much higher temperatures, and are therefore well-suited to geophysical applications (e.g., at temperatures greater than 95° C.-160° C.).

The basic application of magnetometers to reception of EM telemetry signals at the Earth's surface, or to determining drill bit location, are well-known to those of ordinary skill in the art. These applications, using the novel apparatus, systems, and methods disclosed herein, will be described first.

In general, the ambient field can be canceled by measuring the Earth's magnetic field with a relatively insensitive second magnetometer (e.g., a magnetometer that is at least 1000 times less sensitive than the relatively sensitive first magnetometer). For example, a relatively insensitive magnetometer may comprise a flux gate magnetometer that is used to provide gross cancellation of the local field surrounding the sensitive magnetometer, using a Helmholtz coil. To distinguish the relatively insensitive magnetometer from the relatively sensitive magnetometer, the relatively insensitive magnetometer will be referred to herein as the reference magnetometer R, or the second magnetometer. The relatively sensitive magnetometer will be referred to as the Rb (Rubidium vapor) magnetometer M, or the first magnetometer. None of these designations is intended to limit the type of magnetometer chosen for the relatively sensitive or relatively insensitive magnetometers. For example, a diamond magnetometer may also be used as the first magnetometer. Thus, the designations only assume that the relatively sensitive magnetometer is at least one thousand times more sensitive than the relatively insensitive magnetometer.

In some embodiments, a three-axis reference magnetometer R and a three-axis Helmholtz coil are used. Prior to other processing, the signals from the three-axis reference magnetometer can be filtered so as to exclude any component from the signal generated at the drill bit, which is to be detected using the Rb magnetometer M. At anticipated down hole depths, if the signal magnitude (from either EM telemetry or bit location technology) is less than the sensitivity of the reference magnetometer R, the filtering operation is not necessary.

The Rb magnetometer M is mounted within the three-axis Helmholtz coil. The output of the Rb magnetometer M can be filtered to exclude the frequency band of the signal that is to be detected. This filtered output is fed to a signal processing unit that drives the Helmholtz coil so as to minimize the output of the Rb magnetometer M, thus cancelling the ambient field.

Note that cancellation of the portion of the ambient magnetic field that is orthogonal to the axis of sensitivity of the Rb magnetometer M can be shielded out using a material such as mu metal, but the Rb magnetometer M cannot be completely surrounded with shielding because the desired signal would then be extinguished before arriving at the Rb magnetometer M (this is not the case with the downhole application for EM telemetry). Various example embodiments that can provide some or all of these advantages will now be described in detail.

FIG. 1 is a block diagram of apparatus 100 and systems 102 according to various embodiments of the invention. In many embodiments, the apparatus 100 comprises a Rb magnetometer M (e.g., a single axis Rb magnetometer, or similar) having a relatively high sensitivity. The Rb magnetometer M is housed within a Helmholtz coil 108, which may be a single axis unit (e.g., if the Helmholtz coil axis is aligned with the sense axis of the Rb magnetometer M), or a three axis unit. A shield 112 is used to reduce or eliminate the influence of the external field on the Rb magnetometer M. Several techniques can be used to apply the Rb magnetometer M in various situations, and will now be described.

In one embodiment, the ambient field surrounding the Rb magnetometer M is canceled using a single axis Helmholtz coil 108, without the use of a reference magnetometer R. In this case, the Rb magnetometer M resides within a shield 112 that is open along the sense axis of the Rb magnetometer M, and closed against the field along other axes.

The magnetometer M and shield 112 are placed in the center of the single axis Helmholtz coil 108 with the sense axis of the magnetometer M aligned along the symmetry axis of the Helmholtz coil 108. The entire assembly is placed in an orientation that favors detection of the signal from a down hole EM telemetry transmitter, or a magnetic source (e.g., the casing of another well, for ranging) at or near the drill bit. The output of the Rb magnetometer M is digitized and fed to a signal processor SP. The processor SP controls the current that drives the Helmholtz coil 108. Prior to processing, the output of the Rb magnetometer M can be filtered using filter 116, as noted previously.

In some embodiments, a system 102 comprises one or more of the apparatus 100, as well as a housing 104. The housing 104 might take the form of a wireline tool body, or a down hole tool. Processor(s) 130 may be located at the surface 166, as part of a surface workstation 156, in a data acquisition system 124 above or below the Earth's surface 166, or be packaged with the apparatus 100, attached to the housing 104. The system 102 may comprise a data transmitter 144 (e.g., a telemetry transmitter) to transmit acquired data values to the surface workstation 156. Logic 140 can be used to acquire and process signals received from the apparatus 100. Received data can be stored in the memory 150, perhaps as part of a database 134. Thus, many embodiments may be realized.

Figure 2:
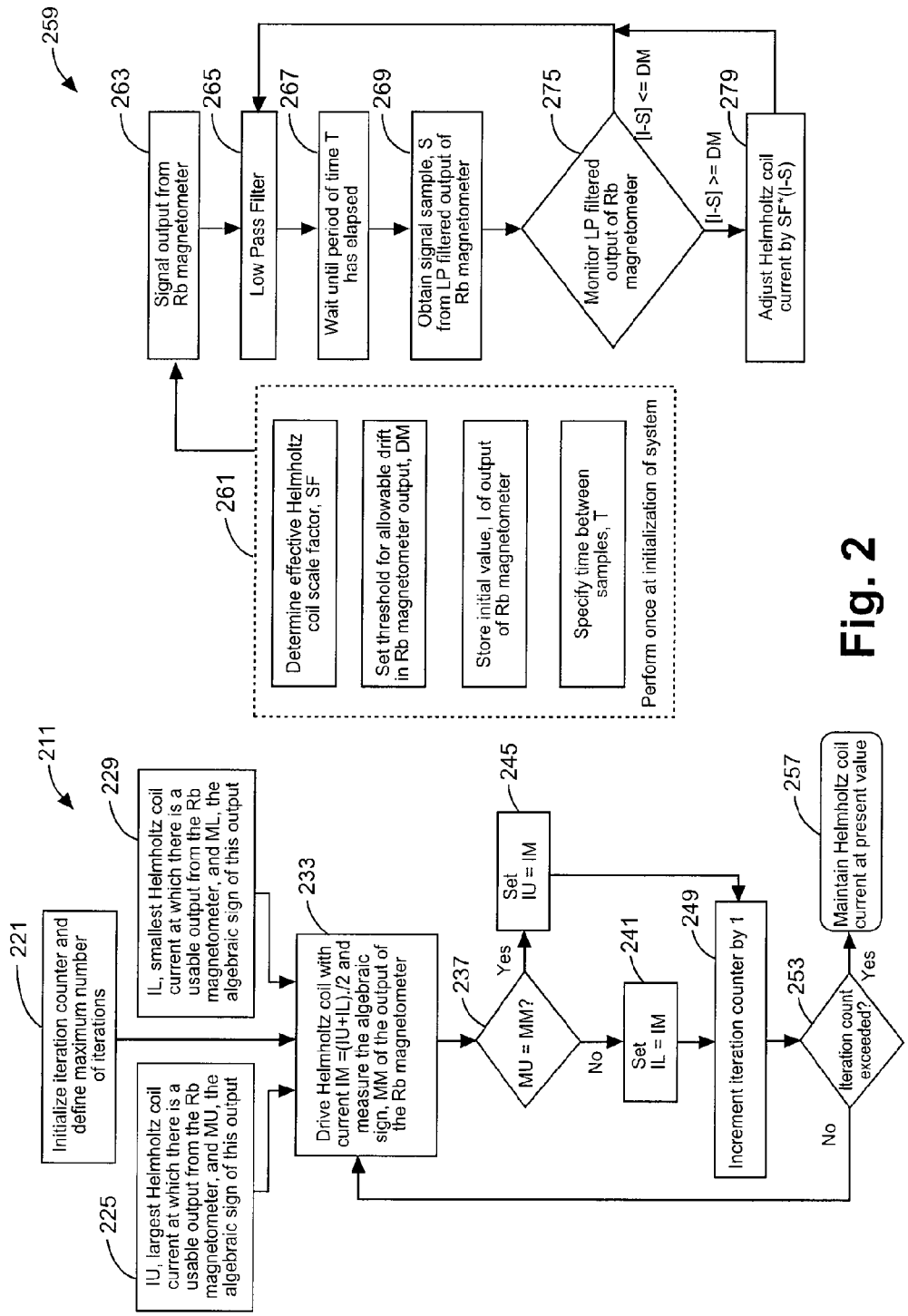
FIG. 2 is a flow chart illustrating several methods according to various embodiments of the invention.

FIG. 2 is a flow chart illustrating several methods 211, 259 according to various embodiments of the invention. These methods 211, 259, which can be used to substantially null the ambient field surrounding the Rb magnetometer, may be applied to a number of configurations of the apparatus 100 shown in FIG. 1.

In method 211, an iteration counter is initialized at block 221. The magnitude and sign of IU (highest drive current to Helmholtz coil to provide useful Rb magnetometer output) and IL (lowest drive current to Helmholtz coil to provide useful Rb magnetometer output) are established to set current search limits at block 225, 229, via the activity at blocks 233, 237, 241, 245, 249, and 253.

The current used to drive the Helmholtz coil is adjusted based on the comparison of MU and MM (the algebraic sign of the Rb magnetometer output corresponding to IU, and the algebraic sign of the Rb magnetometer output when driven with current IM, respectively). ML (the algebraic sign of the Rb magnetometer output corresponding to IL) is not used in the example shown. However, because MU and ML are opposites, those of ordinary skill in the art, after reviewing this disclosure and the figures, will understand that ML could be used in lieu of MU, if the actions shown in the method 211 are reversed.

It is expected that the output of the Rb magnetometer will initially be off-scale, i.e. the ambient field will be so large that no useful output can be obtained. The current through the Helmholtz coil is then stepped through a pre-defined series of values at blocks 233, 237, 241, 245, 249, and 253 until a change is noted in the output of the Rb magnetometer. At this point, it is useful, but not necessary to continue to step through current values until the output of the Rb magnetometer is again off scale, but in the opposite direction (i.e., it changes sign) from its original off scale reading. The two extreme current values at which the Rb magnetometer is capable of responding (IU, IL, recorded at blocks 225, 229) determine the range of currents that should be searched in order to null the ambient field.

Once the useful range of nulling currents (IU, IL) is determined, the current in the Helmholtz coil is set at the average of the upper and lower currents defining the current range and a reading is made of the Rb magnetometer output. A new current range is defined by selecting the mid-range current value IM and the current value at the end of the original current range that produces an output from the Rb magnetometer opposite in sign to that obtained at the midpoint of the original current range. This is repeated for a fixed number of iterations. The maximum number of iterations normally does not exceed the number of bits needed to produce a full scale reading (refer to table I), because the range of sensitivity for the Rb magnetometer is divided in half during each iteration.

When nulling the ambient field using this technique, it may be useful to low pass filter the output of the Rb magnetometer so as to exclude the signal that is to be detected from entering into the nulling operation.

Once the ambient field has been substantially nulled, the low pass filtered output from the Rb magnetometer can be monitored continuously, to detect drift in the Earth's magnetic field. To begin the method 259 of monitoring and adjusting for drift, scale factors (e.g., SF=Helmholtz drive current scale factor), thresholds (e.g., DM=allowable drift in the Rb magnetometer output), and initial values (e.g., I=initial output of Rb magnetometer, and T=time interval between taking samples of I) can be initialized at block 261.

As part of method 259, the output signal from the Rb magnetometer can be obtained while monitoring takes place, at block 263. Filtering may continue after the ambient field is nullified, at block 265. As part of the monitoring, the output signal of the Rb magnetometer can be sampled, according to the activity at blocks 267, 269. When the output drifts by more than a pre-determined amount (e.g. half of a full scale reading), as determined at block 275, the current in the Helmholtz coil is adjusted to substantially null out the drift. This can be accomplished as part of a single action at block 279, since the output of the Rb magnetometer is a linear function of the field and since, during the original nulling procedure (see method 211), it is possible to monitor the change in the output of the Rb magnetometer as a function of the change in the current in the Helmholtz coil. Appropriate changes can be made in processing the received signal to compensate for changes in the Helmholtz coil current.

Those of ordinary skill in the art will realize, after reading this disclosure and the attached figures, that the methods 211, 259 can be accomplished using analog electronics. However, the system response frequency should be outside of the frequency band of the data signal. Ambient field cancellation using a three axis reference magnetometer and a three axis Helmholtz coil will now be discussed.

In this embodiment, the reference magnetometer R may be incorporated into the apparatus 100 as shown in FIG. 1. The current in the three axis Helmholtz coil 108 can be initialized by providing an initial nulling of the cross-axial field in the Rb magnetometer M using the estimated orientation of the Rb magnetometer M and substantially nulling the axial field using method 211, since each Helmholtz coil has a characteristic scale factor that defines the ratio of the field at the center of the coil to the current passing through the coil. Using a mu metal shield 112 to screen out the greater portion of the cross-axial ambient field, as shown in FIG. 1, along with the method 211 of FIG. 2, should facilitate proceeding from initial cross-axial compensation, to determining the current needed to buck the axial component of the ambient field.

Once the apparatus 100 has been initialized (i.e., initial field values have been determined for successful operation of the Rb magnetometer M), corrections to accommodate changes in the ambient field can be made directly from magnetometer readings. This can be more easily accomplished by aligning the sense axis of the Rb magnetometer M in the same direction as one of the three sense axes of the reference magnetometer R. In this case, when the ambient field along that sense axis changes by a certain amount, an appropriate change can be made in the current in the Helmholtz coil that bucks the ambient field along the Rb magnetometer M sense axis.

Note that when a three axis Helmholtz coil is used to buck the ambient field, an estimate of the heading (relative to the Earth's magnetic field) of the Rb magnetometer M can be made from the currents in the individual Helmholtz coils and the scale factors SF (from coil current to field value). The calculated three-dimensional vector points in the opposite direction of the Earth's magnetic field, and thus defines the orientation of the Rb magnetometer relative to the Earth's field. The orientation of the three axis reference magnetometer R relative to the earth's magnetic field is determined by the three field values it measures. Using both orientations, it is possible, given a new reference magnetic field measurement different from the one used in initializing the system, to predict how much current to pass through each of the Helmholtz coils in order to continue to buck the ambient magnetic field. This procedure is described in the following paragraphs.

Using the three currents in the Helmholtz coils and the scale factors for these coils, one may calculate the three magnetic field components in the reference frame of the Helmholtz coils as a vector $$\vec{B}'=(Bx',By',Bz')$$

One may then calculate the magnitude of the field produced by the Helmholtz coils as:

$$B'=\sqrt{(Bx')^2+(By')^2+(Bz')^2}.$$

If the field observed by the reference magnetometer R is defined by $\vec{B}=(Bx,By,Bz)$, the magnitude of the field observed by the reference magnetometer R can be calculated as:

$$B=\sqrt{Bx^2+By^2+Bz^2}$$

The cross product of the field vector observed with the reference magnetometer R and the field vector produced by the Helmholtz coils will provide a vector orthogonal to both of these vectors. This is the case, unless the field vector observed with the reference magnetometer R and the field vector produced by the Helmholtz coils are in the same direction, in which case the result will be the null vector (no transformation is needed between the two reference frames in this case).

The magnitude of the vector cross product will be the product of the magnitudes of the two vectors, and the sine of the angle between them. The cross product defines an axis of rotation which can be used to rotate measurements from the coordinate system of the reference magnetometer to the coordinate system of the Helmholtz coil.

The angle of rotation ° between the vector field obtained from the Helmholtz coil and the vector field obtained from the reference magnetometer may be determined by using both the magnitude of the cross product and the inner product, as follows (where Abs[ ] stands for "the absolute value of"):

$$\text{Abs}[\vec{B}*\vec{B}']=B*B'*\text{Abs}[\sin[\theta]]$$

$$\vec{B}\cdot\vec{B}'=B*B'*\cos[\theta]$$

Using the rotation axis obtained from the cross product and the rotation angle, a rotation matrix may be derived to define the transformation between the reference magnetometer readings and the field generated by the Helmholtz coil. The derivation of a rotation matrix is well-known to those of ordinary skill in the art. For example, a rotation matrix can be represented as follows:

$$R = \begin{bmatrix} \cos\theta + u_x^2(1-\cos\theta) & u_x u_y(1-\cos\theta) + u_z\sin\theta & u_x u_z(1-\cos\theta) + u_y\sin\theta \\ u_y u_x(1-\cos\theta) + u_z\sin\theta & \cos\theta + u_y^2(1-\cos\theta) & u_y u_z(1-\cos\theta) - u_x\sin\theta \\ u_z u_x(1-\cos\theta) + u_y\sin\theta & u_z u_y(1-\cos\theta) + u_x\sin\theta & \cos\theta + u_z^2(1-\cos\theta) \end{bmatrix}$$

$$B' = R \cdot B$$

where $$B = \begin{pmatrix} Bx \\ By \\ Bz \end{pmatrix}$$

$$B' = \begin{pmatrix} Bx' \\ By' \\ Bz' \end{pmatrix}$$

In the expression for R, ($u_x$, $u_y$, $u_z$) is a unit vector along the axis of rotation in the reference frame of the Helmholtz coil.

To calculate the currents needed to buck the ambient field as it changes, the ambient field is measured using the reference magnetometer, and the bucking field is calculated in the reference frame of the Helmholtz coil using the rotation matrix. The coil scale factors are then used to calculate the magnitude of the currents that will produce the bucking field, and these currents are then used to drive the individual coils.

Ideally, the magnitude of the bucking field produced by the Helmholtz coil is equal to the magnitude of the field measured by the reference coil when the ambient field has been nulled, i.e. ideally Abs[B']=Abs[B]. However, there may be a slight difference in practice, because the limited number of bits provided by any given system does not permit perfect resolution, such that the field is only substantially nulled. Because of this, it is recommended that an additional scaling factor be used to renormalize the magnitude of the bucking field to the magnitude of the field observed by the reference magnetometer each time it is measured.

When the ambient field is nulled by using one of the techniques described herein, the resulting signal from the Rb magnetometer M can be applied to sense the magnetic field from EM telemetry signals, or the location of an oscillating magnetic source downhole. This may provide some advantages.

For example, to appreciate the benefits that can be gained, consider an EM telemetry system with a bandwidth of 30 Hz. Signals from a down hole EM telemetry transmitter can be detected with an E-field sensor (typically a connection between the well head and a remote point in the ground) or by using a magnetometer. Conventional magnetometers (relatively insensitive types, such as flux gate magnetometers) are noise-limited to a sensitivity of 1 nT, at best. This means a Rb magnetometer having a sensitivity of 40 pT/Hz$^5$ can be used to extend the range of signals detected by a factor of about five times. The extended range can be used either to improve the data rate of the measurement system, or its operating depth, or both.

Consider a conventional EM telemetry system, which does not yet utilize its bandwidth efficiently. It is estimated that using the Rb magnetometer having a sensitivity of 40 pT/Hz$^5$ at a fixed depth will permit the data rate to be increased by 0.15 bit/second per dB of signal to noise ratio for each channel. In a five channel system, an overall improvement in data rate of 3.4 bits/sec can be achieved.

Increasing the sensitivity of the magnetometer to 70 fT/Hz$^5$ (higher sensitivities are possible, but have not been achieved with a MEMS (micro-electro-mechanical systems) embodiment) under the same condition, and assuming noise levels remain the same, means the data rate can be (at least) doubled again.

Improved performance can also be viewed in terms of improvements in achievable depth. For example, using a one Hz signal with a 10 dB improvement in signal to noise ratio at a fixed depth for homogeneous formations of five ohm resistivity gives a range improvement of more than 1000 meters.

Down hole applications of the apparatus 100 shown in FIG. 1 include reception of EM telemetry downlink signals, reception of signals in EM telemetry repeaters, reception of signals used for ranging to magnetic objects or to objects carrying low frequency electric currents, mineralogy, and analysis of mud magnetic susceptibility.

It is anticipated that magnetic conditions deep within a borehole are considerably quieter than at the Earth's surface. Hence, the noise floor for magnetic measurements should be somewhat lower than for surface measurements, making ultra-sensitive magnetometers usable down hole.

In the case of ranging applications, an oscillating magnetic field can be induced in a target that is to be located. This can be achieved with a rotating magnet on a drill bit, for example, or using an electromagnetic source, such as a transmitter. Alternating current can also be impressed on the casing of a target well, or the source of a time-varying magnetic field can be placed in the target well.

There is a first type of low frequency ranging where the magnetic field from currents induced in the drillstring are measured, and there is a second type of low frequency ranging where the magnetic field induced in the object that is the subject of the ranging is measured. Different shielding techniques are used for these two types of ranging.

In most cases, the type of shielding applied to down hole EM telemetry reception is the same as that used for the first type of ranging. In these applications, the magnetic field to be measured arises from current traveling along the drillstring.

The design problem to be solved can be appreciated by considering a magnetometer mounted in a cavity in the center of a drillstring or BHA (bottom hole assembly) that carries an electric current distributed with approximately azimuthal symmetry around the drillstring. In this case, it can be shown using Ampere's circuit law that the net magnetic field in the cavity arising from the current is zero.

The situation can be relieved somewhat by introducing asymmetry in the current distribution. Another approach to solving the problem is to sense the magnetic field in a chamber outside of the current path.

Figure 3:
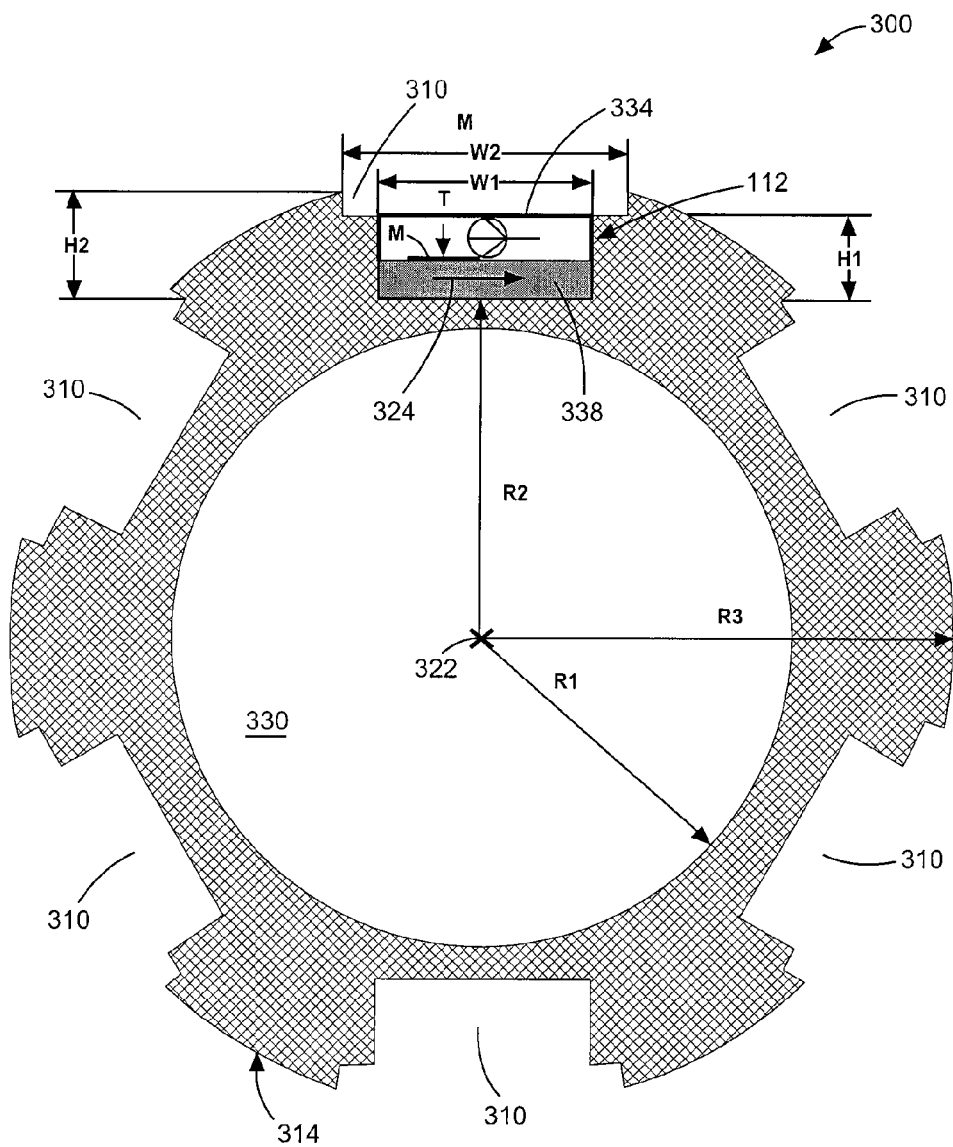
FIG. 3 illustrates a side, cut-away view of a magnetometer mounting configuration according to various embodiments of the invention.

FIG. 3 illustrates a side, cut-away view of a magnetometer mounting configuration 300 according to various embodiments of the invention. Here, a channel 310 is cut in a section of drill collar 314 so as to accommodate a magnetometer M. The sense axis of the magnetometer M is in a direction that is orthogonal to the drill collar longitudinal axis 322, as well as parallel to an axis 324 that parallels the base of the cavity. In other words, the sense axis is orthogonal to a line drawn radially from the central axis of the drill collar, which is orthogonal to the base of the cavity.

In FIG. 3, the magnetometer M responds to the current passing beneath it. That is, between the base of the magnetometer M and the inner bore 330 of the drill collar 314. If possible, the magnetometer M should be placed in the center of the mounting chamber created by the channel and a cover 334 mounted to the top of the channel 310. The cover 334 should be electrically isolated from the body of the drill collar 314.

The configuration 300 may not be as useful in some situations as in others, since the magnetometer M is not protected from the Earth's magnetic field. If the drill collar 314 is made of magnetic material, it will serve to shield some of the earth's magnetic field. Shielding can be provided by making a box of shielding material, such as mu metal, with the walls and ceiling of the box serving as the walls and lid of the channel 310. The floor of the box is removed so as not to shield out the field created by electric current passing beneath the magnetometer M. To concentrate the flow of current beneath the magnetometer M, a copper bar 338 can be silver-soldered to the floor and/or walls of the channel 310.

In mounting configuration 300, the magnetometer response is greatly improved over simply mounting a magnetometer on the outer surface of a drill collar 314. Without the improvements shown, a significant portion of the magnetic field from the current in the drill collar is not received by the magnetometer, since only a small portion of the current passes beneath the magnetometer. The improved response is obtained by using the configuration 300, where a significant amount of metal has been removed from the drill collar 314, increasing the net electrical resistance of the section of the drill collar (i.e., the channel 310) beneath the magnetometer M.

In addition, configuration 300 shows a copper bar 338 disposed in the cavity 310 containing the magnetometer M, between the magnetometer M and the bottom of the channel 310 cut into the drill collar 314. Since copper has a significantly higher conductivity than the steels typically used to construct drill collars, the copper bar 338 provides a preferential current path. The bar 338 may be silver-soldered into the cavity 310, with elongated ends placed in intimate contact with the walls of the cavity 310 via the silver solder. Configuration 300 tends to force current toward the center of the drill collar 314, beneath the magnetometer M.

Finally, in configuration 300, the cavity 310 and the parallel cutouts from the drill collar 314 are shown to be as long as is practical. This serves two purposes: (a) it allows launching current onto the copper bar 338, and (b) it allows monitoring the potential difference across one of the cavities 310 (which can also be used to detect signals).

With the geometry of configuration 300, the fraction F of the current that passes through the copper bar 338, and hence under the magnetometer M, is given by:

$$F = \frac{\sigma Cu * T * W1}{\sigma Cu * T * W1 + \sigma steel * (\pi * (R3^3 - R1^2) - 5 * H1 * W1)},$$

where σCu is the electrical conductivity of copper in mhos/meter, and T is the thickness of the copper bar in meters.

For parametric analysis, T=αH1, where H1=depth of the mounting cavity 310 in meters, 0≤α≤1 is a dimensionless parameter, W1=width of the cavity 310 in meters, and σsteel is the electrical conductivity of the material constituting the body of the drill collar 314 in mhos/meter. R1 is the inner radius of the drill collar 314 in meters, and R3 is the outer radius of the drill collar 314 in meters. For simplicity, it assumed that the covers 334 to the cavities (not shown) are included in the conductivity calculation, but in some embodiments, the covers 334 are electrically isolated.

The bar 338 can be made of any material with a conductivity that is higher than that of the material used to construct the drill collar. Copper is only one possible choice. Silver is another choice, but the use of silver may not be justified due to cost considerations, and the expected incremental improvement in performance over that which is obtained using copper.

In some embodiments, F as a function of a is simulated for σCu=6.3 $10^7$ mhos/meter, σsteel=1.37 $10^7$ mhos/meter (this can be as small as ~6$(10)^6$ mhos/meter), W1=0.01376 meter, H1=0.0268 meter, R1=0.034925 meter, R3=0.085725 meter. As shown in FIG. 3, there are six cavities 310, one of which contains a copper bar 338 with the magnetometer M and the mu metal shield 112. In this case, the mu metal shield 112 is assumed to be electrically isolated from the cavity 310. If the magnetometer were to be mounted in a cavity without shielding or a copper bar with silver solder, it is estimated that only 0.6% of the current would pass under the magnetometer as is calculated to occur with the implementation shown in FIG. 3.

Thus, referring now to FIGS. 1-3, it can be seen that many embodiments may be realized. For example, in some embodiments an apparatus 100 comprises two magnetometers, a Helmholtz coil, and a signal processor. That is, an apparatus 100 may comprise a first magnetometer M at least partially disposed within a Helmholtz coil 108, and a second magnetometer R having a sensitivity at least one thousand times less than the first magnetometer M. The apparatus 100 may also comprise a signal processor SP configured to drive the Helmholtz coil 108 according to a signal provided by the second magnetometer R so as to substantially null the ambient Earth magnetic field surrounding the first magnetometer M, and to receive a down hole location signal or a down hole telemetry signal from the first magnetometer M.

The first, or sensitive magnetometer can be of the Rb or diamond type. Thus, the first magnetometer M may comprise at least one of a Rb magnetometer or a diamond magnetometer.

The second, or insensitive magnetometer can be of the flux gate type. Thus, the second magnetometer R may comprise a flux gate magnetometer.

To null the Earth's magnetic field, the axes of the insensitive magnetometer can be aligned with the axes of the Helmholtz coil. Thus, the Helmholtz coil 108 and the second magnetometer R may each comprise three-axis units substantially aligned along the three axes.

If the Helmholtz coil and the sensitive magnetometer sense axes are aligned, single axis units can be used. Thus, the Helmholtz coil 108 and the first magnetometer M may each comprise single-axis units substantially aligned along the single axis.

If the Earth's magnetic field drifts, the Helmholtz coil drive can be altered to compensate. A low-pass filter can be used on the sensitive coil output to determine whether drift exists. Thus, the apparatus 100 may comprise a low pass filter 116 coupled to an output of the first magnetometer M, the low pass filter 116 to provide a drift monitoring output associated with the Earth's magnetic field.

If a mu metal shield is not used, or is only partially effective in screening out the cross-axial field, an additional pair of single axis Helmholtz coils with fields orthogonal to each other and to the direction of the sense axis of the Rb magnetometer can be used. In this case, it may be helpful to know the general orientation of the Rb magnetometer relative to the Earth's magnetic field. This can be used to set an initial value and orientation for a cross-axial field from the Helmholtz coils to buck out the cross-axial component of the ambient field.

Refinements can be made through an iterative process, although searching a three-dimensional space to carry out the iterations can adversely impact the time it takes to render the Rb magnetometer useful. The value of the ambient field and the estimate of the cross-axial field component can be provided using typical values for the area of operation, or by a reference magnetometer.

A mu-metal (nickel, iron, copper, and molybdenum), or nickel-iron alloy shield can be used to enhance the effectiveness of the sensitive magnetometer M along its sense axis. A "magnetically permeable" shield may also be used, having a permeability of greater than 500 relative to a vacuum, and in some embodiments, greater than 50,000 at frequencies of less than 100 Hz. Such materials may include NETIC® S-36 foil, CONETIC-AA® foil, and Nanovate™-EM coating, all available from Magnetic Shield Corporation of Bensenville, Ill. Thus, in some embodiments, the apparatus 100 comprises a magnetically-permeable shield 112 substantially surrounding the first magnetometer M, with an opening substantially aligned with a sense axis of the first magnetometer M.

Figure 4:
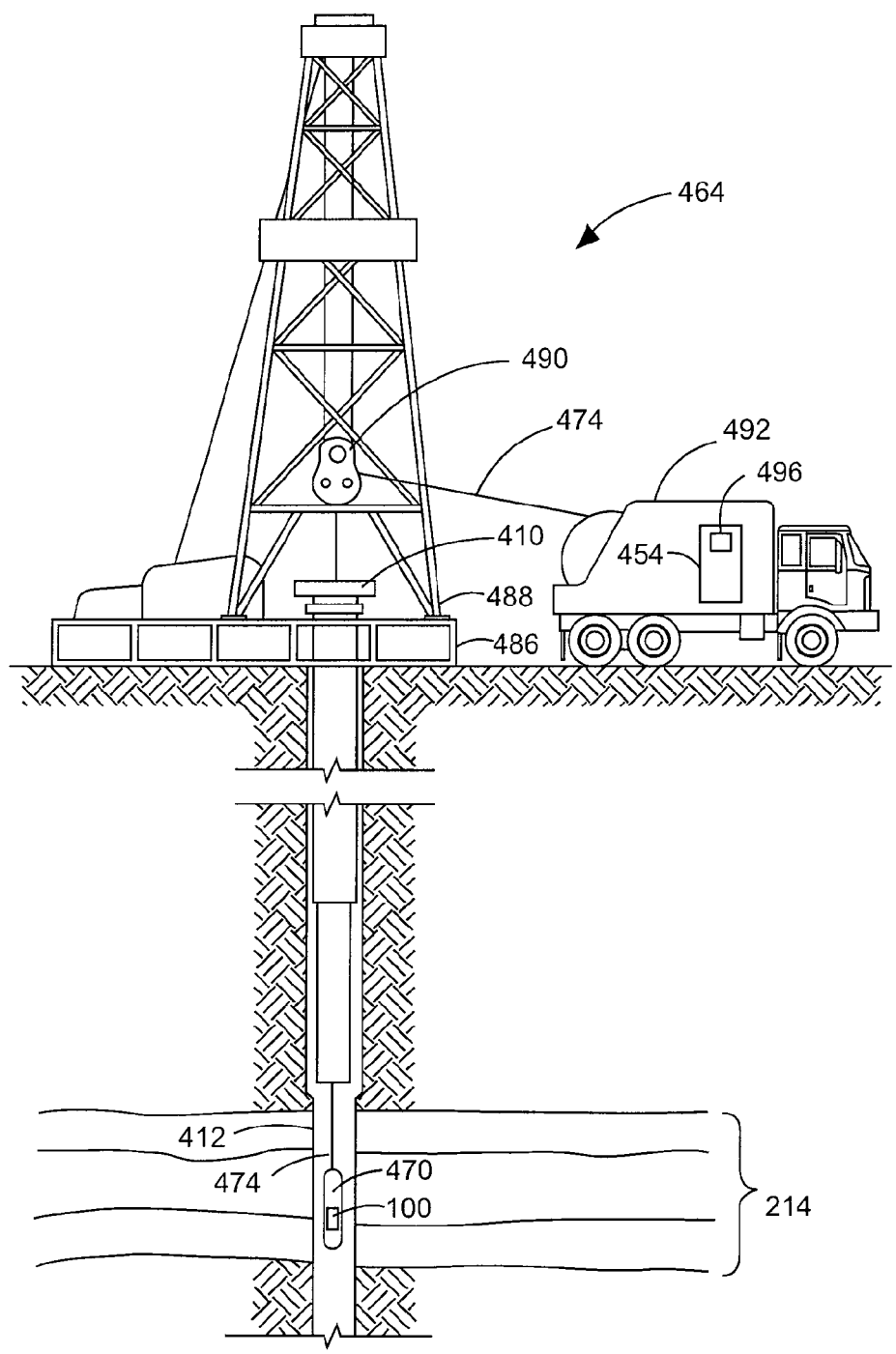
FIG. 4 illustrates a wireline system embodiment of the invention.
Figure 5:
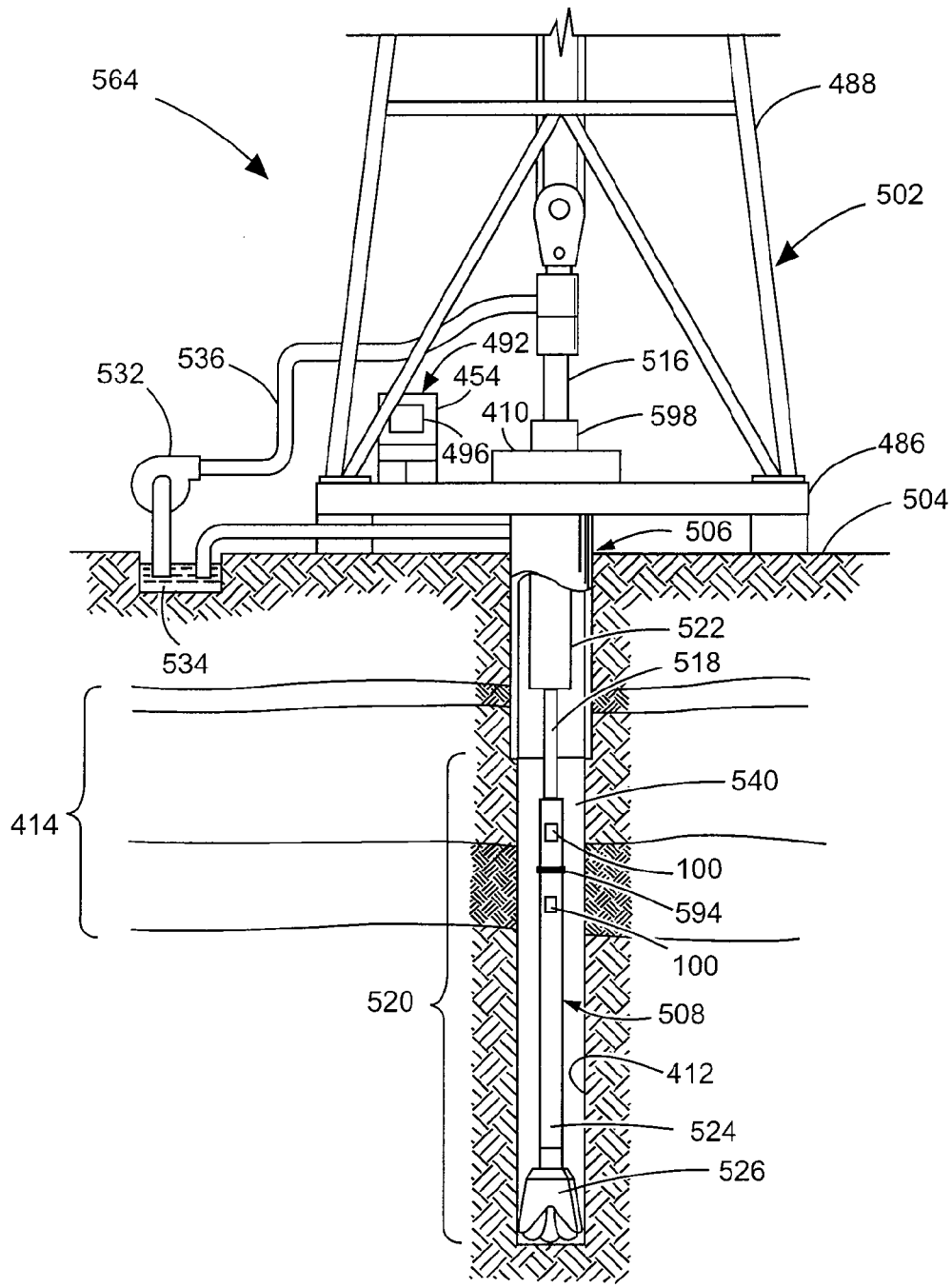
FIG. 5 illustrates a drilling rig system embodiment of the invention.

FIG. 4 illustrates a wireline system 464 embodiment of the invention, and FIG. 5 illustrates a drilling rig system 564 embodiment of the invention. Thus, the systems 464, 564 may comprise portions of a wireline logging tool body 470 as part of a wireline logging operation, or of a down hole tool 524 as part of a down hole drilling operation.

Thus, FIG. 4 shows a well during wireline logging operations. In this case, a drilling platform 486 is equipped with a derrick 488 that supports a hoist 490.

Drilling oil and gas wells is commonly carried out using a string of drill pipes connected together so as to form a drilling string that is lowered through a rotary table 410 into a wellbore or borehole 412. Here it is assumed that the drilling string has been temporarily removed from the borehole 412 to allow a wireline logging tool body 470, such as a probe or sonde, to be lowered by wireline or logging cable 474 into the borehole 412. Typically, the wireline logging tool body 470 is lowered to the bottom of the region of interest and subsequently pulled upward at a substantially constant speed.

During the upward trip, at a series of depths the instruments (e.g., the apparatus 100, or system 102 shown in FIG. 1) included in the tool body 470 may be used to perform measurements on the subsurface geological formations 414 adjacent the borehole 412 (and the tool body 470). The measurement data can be communicated to a surface logging facility 492 for storage, processing, and analysis. The logging facility 492 may be provided with electronic equipment for various types of signal processing, which may be implemented by any one or more of the components of the apparatus 100 or system 102 in FIG. 1. Similar formation evaluation data may be gathered and analyzed during drilling operations (e.g., during LWD operations, and by extension, sampling while drilling).

In some embodiments, the tool body 470 comprises a magnetic tool for obtaining and analyzing magnetic field measurements in a subterranean formation through a borehole. The tool is suspended in the wellbore by a wireline cable 474 that connects the tool to a surface control unit (e.g., comprising a workstation 454). The tool may be deployed in the borehole 412 on coiled tubing, jointed drill pipe, hard wired drill pipe, or any other suitable deployment technique.

Turning now to FIG. 5, it can be seen how a system 564 may also form a portion of a drilling rig 502 located at the surface 504 of a well 506. The drilling rig 502 may provide support for a drill string 508. The drill string 508 may operate to penetrate the rotary table 410 for drilling the borehole 412 through the subsurface formations 414. The drill string 508 may include a Kelly 516, drill pipe 518, and a bottom hole assembly 520, perhaps located at the lower portion of the drill pipe 518.

The bottom hole assembly 520 may include drill collars 522, a down hole tool 524, and a drill bit 526. The drill bit 526 may operate to create the borehole 412 by penetrating the surface 504 and the subsurface formations 414. The down hole tool 524 may comprise any of a number of different types of tools including MWD tools, LWD tools, and others.

During drilling operations, the drill string 508 (perhaps including the Kelly 516, the drill pipe 518, and the bottom hole assembly 520) may be rotated by the rotary table 410. Although not shown, in addition to, or alternatively, the bottom hole assembly 520 may also be rotated by a motor (e.g., a mud motor) that is located down hole. The drill collars 522 may be used to add weight to the drill bit 526. The drill collars 522 may also operate to stiffen the bottom hole assembly 520, allowing the bottom hole assembly 520 to transfer the added weight to the drill bit 526, and in turn, to assist the drill bit 526 in penetrating the surface 504 and subsurface formations 414.

During drilling operations, a mud pump 532 may pump drilling fluid (sometimes known by those of ordinary skill in the art as "drilling mud") from a mud pit 534 through a hose 536 into the drill pipe 518 and down to the drill bit 526. The drilling fluid can flow out from the drill bit 526 and be returned to the surface 504 through an annular area 540 between the drill pipe 518 and the sides of the borehole 412. The drilling fluid may then be returned to the mud pit 534, where such fluid is filtered. In some embodiments, the drilling fluid can be used to cool the drill bit 526, as well as to provide lubrication for the drill bit 526 during drilling operations. Additionally, the drilling fluid may be used to remove subsurface formation cuttings created by operating the drill bit 526.

Thus, referring now to FIGS. 1 and 3-5, it may be seen that in some embodiments, the systems 464, 564 may include a drill collar 522, a down hole tool 524, and/or a wireline logging tool body 470 to house one or more apparatus 100, similar to or identical to the apparatus 100 described above and illustrated in FIG. 1. Components of the system 102 in FIG. 1 may also be housed by the tool 524 or the tool body 470.

Thus, for the purposes of this document, the term "housing" may include any one or more of a drill collar 522, a down hole tool 524, or a wireline logging tool body 470 (all having an outer wall, to enclose or attach to magnetometers, sensors, fluid sampling devices, pressure measurement devices, transmitters, receivers, acquisition and processing logic, and data acquisition systems). The tool 524 may comprise a down hole tool, such as an LWD tool or MWD tool. The wireline tool body 470 may comprise a wireline logging tool, including a probe or sonde, for example, coupled to a logging cable 474. Many embodiments may thus be realized.

For example, in some embodiments, a system 464, 564 may include a display 496 to present magnetic signal information, both measured and processed/calculated, as well as database information, perhaps in graphic form. A system 464, 564 may also include computation logic, perhaps as part of a surface logging facility 492, or a computer workstation 454, to receive signals from transmitters and receivers, and other instrumentation to determine properties of the formation 414.

Thus, a system 464, 564 may comprise a down hole tool body, such as a wireline logging tool body 470 or a down hole tool 524 (e.g., an LWD or MWD tool body), and one or more apparatus 100 attached to the tool body, the apparatus 100 to be constructed and operated as described previously.

The housing, which may comprise a drill collar, may be machined with channels on its outer surface to force a greater amount of current to travel along the inner surface of the housing. The apparatus 100 can be disposed within one of the channels. Thus, the system 102, 464, 564 may be constructed so that the down hole tool housing has a plurality of longitudinal channels 310 around an outer perimeter, wherein the first magnetometer M is disposed within a covered one of the channels (e.g., see cover 334 in FIG. 3), along with a copper bar 338 attached to the down hole tool housing.

In applications where an external time varying field is sensed, an insulating gap 594 in the drill collar may be used, located as closely as is practical to the magnetometer M. Thus, the system 102, 464, 564 may be constructed with an insulating gap 594 in the drill collar, the insulating gap 594 proximate to the first magnetometer M or the second magnetometer R.

The apparatus 100; systems 102, 464, 564; housing 104; Helmholtz coil 108; shield 112; filter 116; data acquisition system 124; processors 130; database 134; transmitter 144; memory 150; workstations 156, 454; surface 166; mounting configuration 300; channels 310; drill collar 314; inner bore 330; cover 334; bar 338; rotary table 410; borehole 412; computer workstations 454; wireline logging tool body 470; logging cable 474; drilling platform 486; derrick 488; hoist 490; logging facility 492; display 496; drill string 508; Kelly 516; drill pipe 518; bottom hole assembly 520; drill collars 522; down hole tool 524; drill bit 526; mud pump 532; mud pit 534; hose 536; reference magnetometer R; and Rb magnetometer M may all be characterized as "modules" herein.

Such modules may include hardware circuitry, and/or a processor and/or memory circuits, software program modules and objects, and/or firmware, and combinations thereof, as desired by the architect of the apparatus 100 and systems 102, 464, 564 and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for logging operations, and thus, various embodiments are not to be so limited. The illustrations of apparatus 100 and systems 102, 464, 564 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Such apparatus and systems may further be included as sub-components within a variety of electronic systems, such as televisions, cellular telephones, personal computers, workstations, radios, video players, vehicles, signal processing for geothermal tools and smart transducer interface node telemetry systems, among others. Some embodiments include a number of methods.

Figure 6:
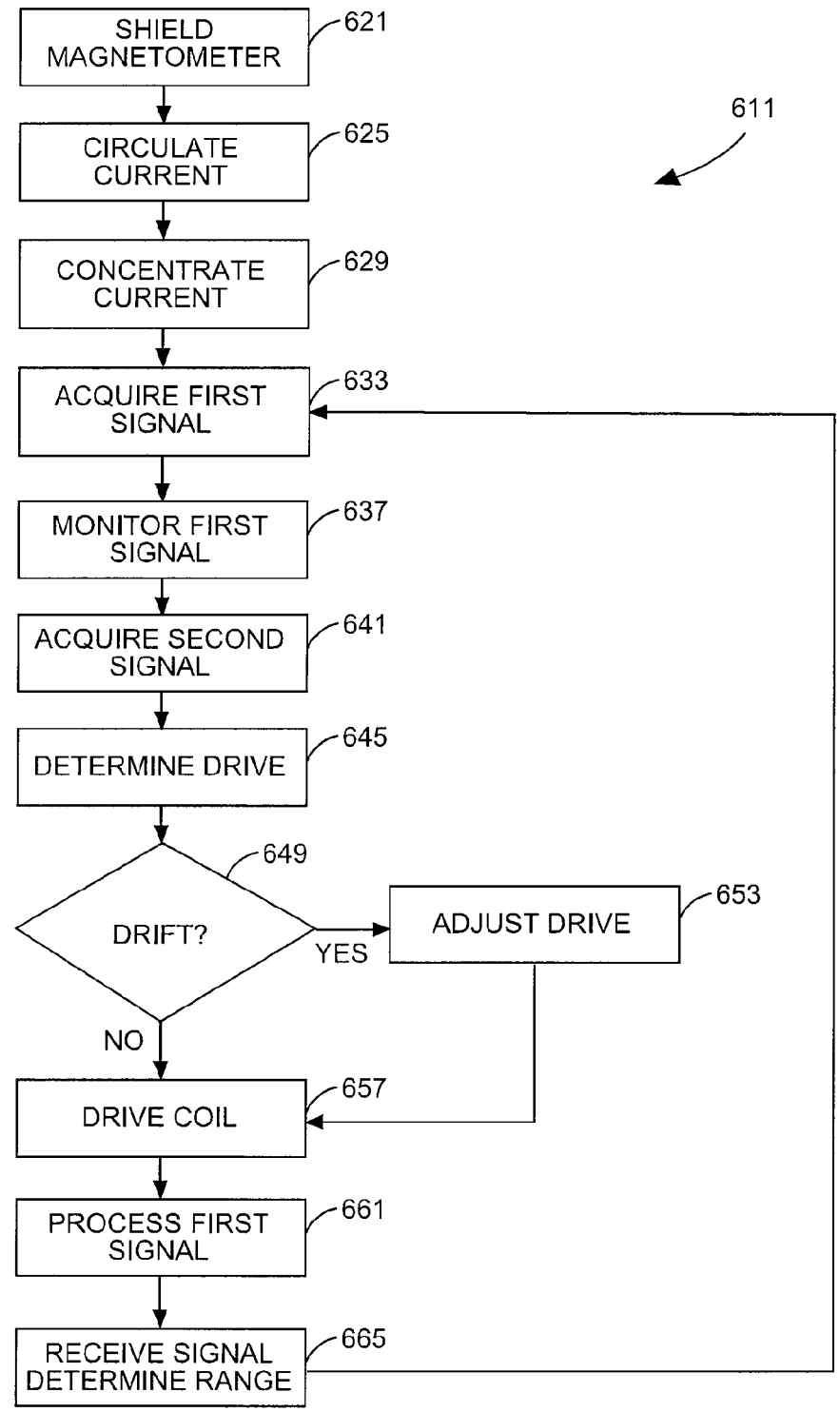
FIG. 6 is a flow chart illustrating several additional methods according to various embodiments of the invention.

For example, FIG. 6 is a flow chart illustrating several additional methods 611 according to various embodiments of the invention. In some embodiments, the methods 611 may include acquiring a signal from an insensitive magnetometer, which is used to null the Earth's field by driving a Helmholtz coil surrounding a sensitive magnetometer. In this way, the sensitive magnetometer can be used to sense relatively small signals, such as ranging signals from a well casing, or down hole telemetry signals. The signal received by the sensitive magnetometer may be an oscillating signal (e.g., a signal induced in the casing or bit), or a static signal that appears to vary due to rapid descent of a drill bit within the distance that can be detected by the magnetometer.

In some embodiments, a shield may be used to enhance the useful sensitivity along the sense axis of the sensitive magnetometer. Thus, a method 611 may begin at block 621 with shielding the first magnetometer with a magnetic shielding material in substantially all directions that are not aligned with a sense axis of the first magnetometer.

The sensitive magnetometer can be made more effective if currents associated with the signal it receives circulate in close physical proximity. Thus, the method 611 may continue on to block 625 with circulating current associated with the signal received by the first magnetometer (e.g., the first signal) around the first magnetometer. The method 611 may continue on to block 629 to include concentrating current associated with the first signal in a path by providing the path as one of increased conductivity relative to a ferrous housing surrounding the first magnetometer (e.g., refer to FIG. 3).

The method 611 may continue on to block 633 with acquiring the first signal from the first magnetometer, where the first magnetometer is at least partially disposed within a Helmholtz coil.

The sensitive magnetometer can be disposed in a drill collar. Thus, the activity at block 633 may include acquiring the first signal from the first magnetometer when the first magnetometer is disposed within a drill collar.

In some embodiments, the first signal may be monitored. For example, the method 611 may include, at block 637, monitoring a low-pass filtered version of the first signal. In this way, drift (e.g., of the Earth's magnetic field) may be more easily detected.

The method 611 may go on to block 641 to include acquiring a second signal from a second magnetometer having a sensitivity at least one thousand times less than the first magnetometer.

In most embodiments, the method 611 includes processing the second signal to determine a drive signal (for the Helmholtz coil) at block 645. For example, the Helmholtz coil drive signal can be determined by iteratively searching for a useful value. Thus, the activity at block 645 may comprise determining the drive signal by repeatedly varying a current to the Helmholtz coil so as to establish upper and lower values of the current that provide a usable value of the first signal (e.g., see the methods shown in FIG. 2).

The low-pass filtered (and monitored) output from the sensitive magnetometer may be used to indicate drift in the Earth magnetic field. Thus, the method 611 may include, at block 649, detecting drift in the Earth magnetic field by monitoring a low-pass filtered version of the first signal.

Once drift is detected, operation of the apparatus can be corrected. Thus, the method 611 may include, upon detecting the drift has exceeded a predetermined amount, adjusting the drive signal by a scaling factor times the drift at block 653.

The method 611 may continue on to block 657 to include driving the Helmholtz coil using the drive signal so as to substantially null an ambient Earth magnetic field surrounding the first magnetometer.

The method 611 may continue on to block 661 to include processing the first signal as one of a down hole location signal or a down hole telemetry signal. The location signal can be used to determine the range to a sub-surface object, and the telemetry signal can be used to provide data from down hole drilling operations.

The range determination made by the sensitive magnetometer can be the range from the magnetometer to the casing in another well. Thus, the method 611 may include, at block 665, determining the range to the sub-surface object as approximately the range from the first magnetometer to a well casing installed in a second wellbore that is different from the first wellbore. In this case, the first magnetometer is substantially surrounded by the first wellbore.

An electromagnetic telemetry transmitter can be used to communicate information to the sensitive magnetometer. Thus, the activity at block 665 may comprise receiving the first signal from a down hole telemetry transmitter during the down hole drilling operations. Still further embodiments may be realized.

It should be noted that the methods described herein do not have to be executed in the order described, or in any particular order. Moreover, various activities described with respect to the methods identified herein can be executed in iterative, serial, or parallel fashion. The various elements of each method (e.g., the methods shown in FIGS. 2 and 6) can be substituted, one for another, within and between methods. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. For example, the programs may be structured in an object-orientated format using an object-oriented language such as Java or C#. In another example, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 7:
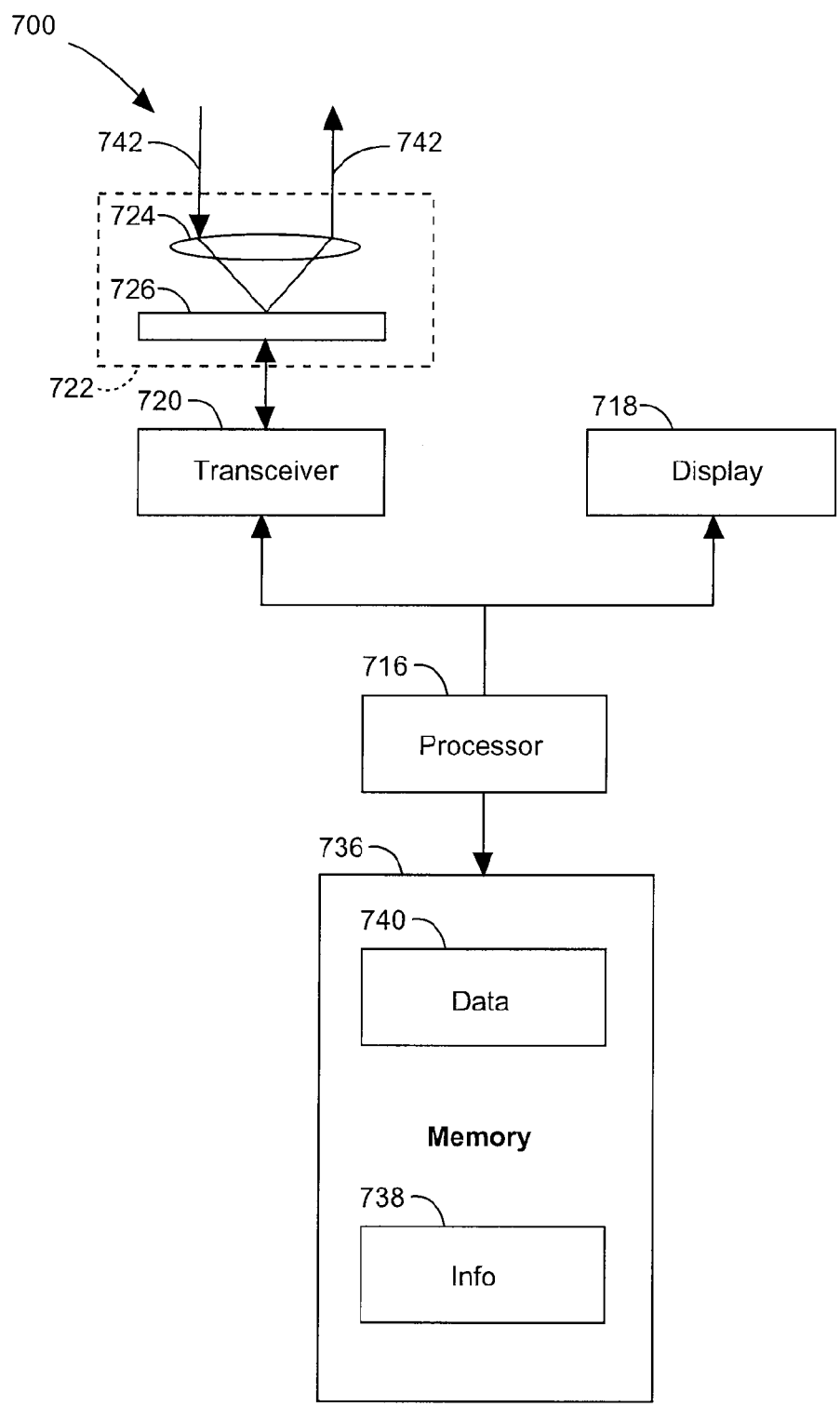
FIG. 7 is a block diagram of an article according to various embodiments of the invention.

For example, FIG. 7 is a block diagram of an article 700 of manufacture according to various embodiments, such as a computer, a memory system, a magnetic or optical disk, or some other storage device. The article 700 may include one or more processors 716 coupled to a machine-accessible medium such as a memory 736 (e.g., removable storage media, as well as any tangible, non-transitory memory including an electrical, optical, or electromagnetic conductor) having associated information 738 (e.g., computer program instructions and/or data), which when executed by one or more of the processors 716, results in a machine (e.g., the article 700) performing any actions described with respect to the methods of FIGS. 2 and 6, the apparatus of FIG. 1, and the systems of FIGS. 1, 4, and 5. The processors 716 may comprise one or more processors sold by Intel Corporation (e.g., Intel® Core™ processor family), Advanced Micro Devices (e.g., AMD Athlon™ processors), and other semiconductor manufacturers.

In some embodiments, the article 700 may comprise one or more processors 716 coupled to a display 718 to display data processed by the processor 716 and/or a wireless transceiver 720 (e.g., a down hole telemetry transceiver) to receive and transmit data processed by the processor.

The memory system(s) included in the article 700 may include memory 736 comprising volatile memory (e.g., dynamic random access memory) and/or non-volatile memory. The memory 736 may be used to store data 740 processed by the processor 716.

In various embodiments, the article 700 may comprise communication apparatus 722, which may in turn include amplifiers 726 (e.g., preamplifiers or power amplifiers) and one or more antenna 724 (e.g., transmitting antennas and/or receiving antennas). Signals 742 received or transmitted by the communication apparatus 722 may be processed according to the methods described herein.

Many variations of the article 700 are possible. For example, in various embodiments, the article 700 may comprise a down hole tool, including the apparatus 100 shown in FIG. 1. In some embodiments, the article 700 is similar to or identical to the apparatus 100 or system 102 shown in FIG. 1.

Figure 8:
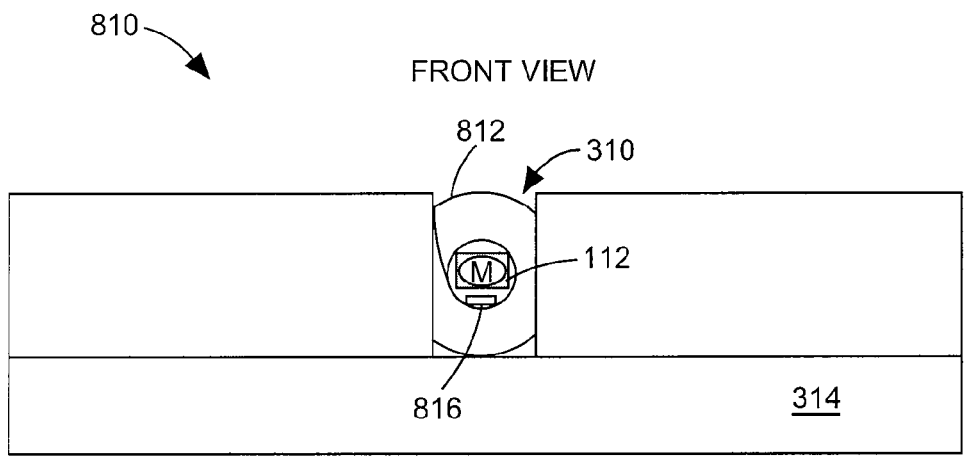
FIG. 8 illustrates front and top views of another magnetometer mounting configuration according to various embodiments of the invention.
Figure 8:
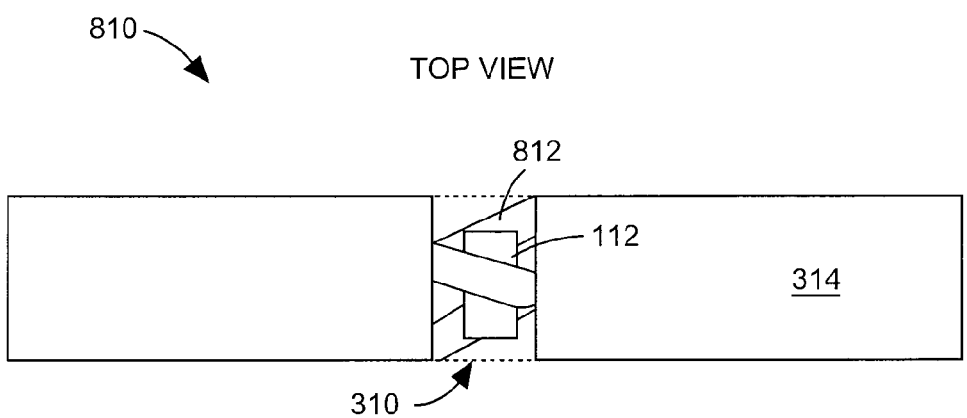
Figure 9:
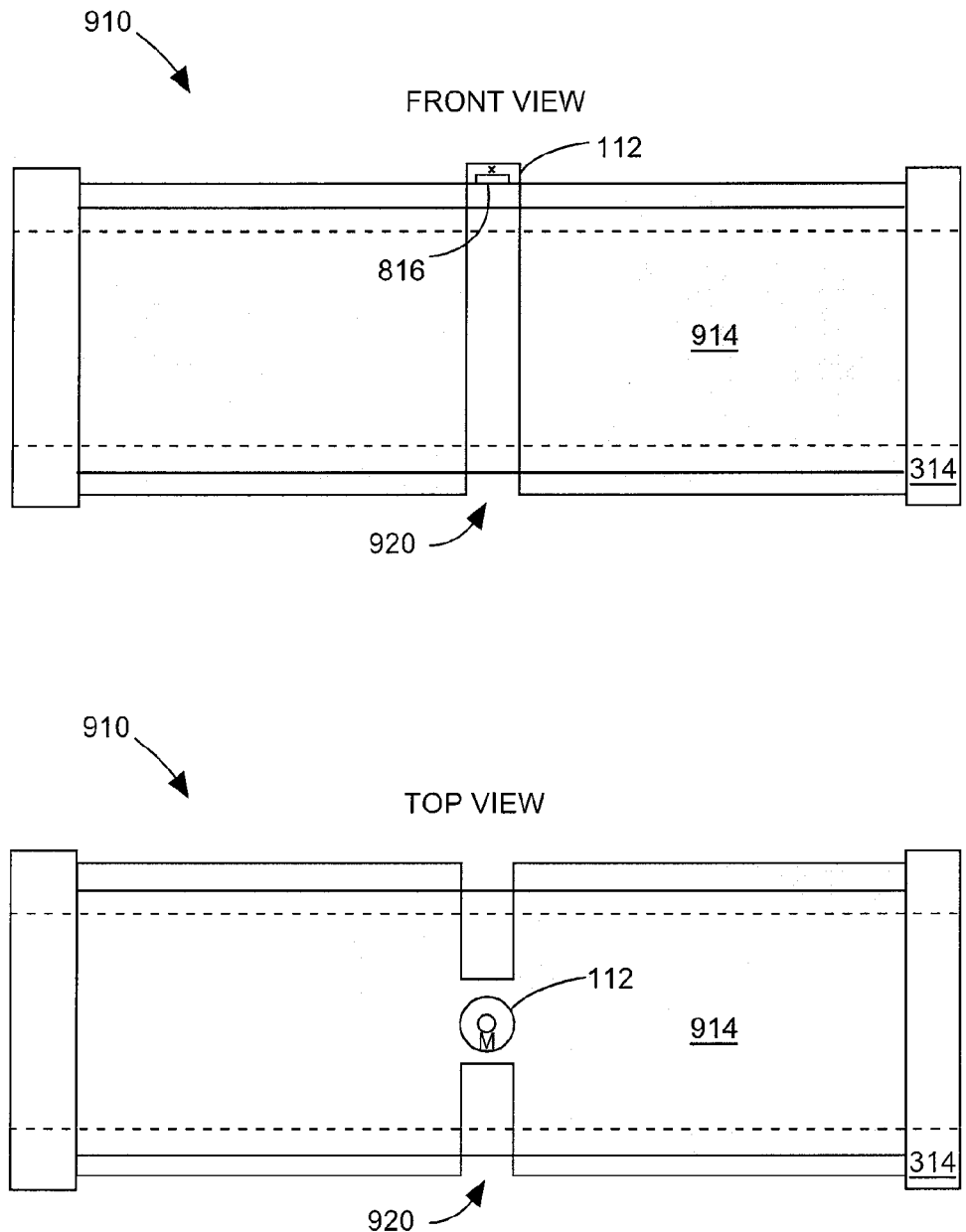
FIG. 9 illustrates front and top views of yet another magnetometer mounting configuration according to various embodiments of the invention.

FIGS. 8 and 9 illustrate additional magnetometer mounting configurations 810, 910 respectively, according to various embodiments of the invention. In contrast to the configuration 310 shown in FIG. 3, the sensitivity of the magnetometer M can be further enhanced by either modifying the copper bar so as to form a loop around the magnetometer (see the front and top views of configuration 810), or by placing a piece of ferrite underneath the magnetometer (see configuration 300, in FIG. 3), or both. The ferrite is a material with a relatively high magnetic permeability, which should not contact the mu metal shield, to prevent creating a magnetic short circuit.

As noted previously, magnetometers suitable for the applications of this disclosure have been fabricated as MEMS devices. At this scale, when the application calls for it, Helmholtz coils can be included with the downhole apparatus (e.g., in a drill collar 314) to buck out the ambient field. This may be used in combination with the geometries shown in FIGS. 3, and 8-9, with the common axis of the two coils of these figures constituting the Helmholtz coil along the sense axis of the magnetometer M, and with the magnetometer M centered between these two coils, so that the sense axis of the magnetometer M is directed along the longitudinal axis of the copper helix 812. The magnetometer M is shielded using a shield 112 of mu metal. A rod 816 of high-permeability ferrite can be placed within the helix 812, between the magnetometer M and the base of the cavity 310 to further concentrate the flux.

FIG. 9 illustrates a somewhat different approach in which as much copper as is practical is used to channel current beneath the magnetometer. The drill collar 314 has a cylindrical cutout channel 920 (which may have a housing around it—this is not shown in FIG. 9.) A copper jacket 914 surrounds the inner cylinder, but is narrowed down to a single channel underneath the magnetometer M, thus diverting the bulk of the current directly beneath the magnetometer M, which has a sense axis indicated by the label X. A ferrite bar 816 may be placed beneath the magnetometer M, as described with respect to FIG. 8.

The copper jacket 914 may be silver-soldered at all points of contact with the drill collar 314. In some embodiments, use of the copper jacket 914 may be undesirable, since the resulting configuration 910 may be substantially less rigid than the rest of the BHA.

A large number of other configurations are possible. Strategies to implement these configurations include: (a) channeling current as close to the magnetometer M as possible, (b) if practical, circulating the current around the magnetometer M, (c) concentrating the magnetic field from the current using a ferritic or similar material (e.g., the ferrite bar 816), (d) shielding out the ambient field using a mu metal shield 112 and/or one or more Helmholtz coils, and (e) electrically isolating the mu metal shield 112 from the rest of the system.

In some embodiments, an external, time varying field is sensed. In this instance, such as when a magnetic or low frequency electromagnetic ranging application is employed, it may be useful to locate an insulating gap in the drill collar as close as is practically possible to the magnetometer M (see element 594 in FIG. 5, for example). The gap helps prevent currents launched in the drill string from creating fields that are sensed by the magnetometer. It may desirable in such applications to make bi-axial or tri-axial measurements, perhaps using magnetometers having sense axes that are orthogonal to each other. Mu metal shields can be used around these magnetometers, open along the sense axes.

The ambient field along the sense axis of each magnetometer in these external field sensing applications can be bucked out using a Helmholtz coil and a reference to less sensitive magnetometers mounted in a portion of the drill string that is substantially free of magnetic interference. The ambient field can be nulled in essentially the same way as described previously. However, if the drill string is rotating while measurements are made, some account may be taken for the resulting relatively rapid variations in the Earth's magnetic field in the reference frame of the drillstring.

In summary, using the apparatus, systems, and methods disclosed herein may provide increased magnetic field measurement sensitivity, relative to conventional mechanisms.

As a result, the depth, range, and/or data rate of electromagnetic telemetry systems may be extended, as may the range at which magnetic bodies and oscillating electromagnetic sources can be sensed remotely. A combination of these advantages can significantly enhance the value of the services provided by an operation/exploration company, while at the same time controlling time-related costs.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A processor-implemented method, comprising:
   acquiring a first signal from a first magnetometer at least partially disposed within a Helmholtz coil;
   acquiring a second signal from a second magnetometer having a sensitivity at least one thousand times less than the first magnetometer;
   processing the second signal to determine a drive signal;
   driving the Helmholtz coil using the drive signal so as to substantially null an ambient Earth magnetic field surrounding the first magnetometer; and
   processing the first signal as one of a down hole location signal or a down hole telemetry signal, the location signal to determine a range to a sub-surface object, and the telemetry signal to provide data from down hole drilling operations.

2. The method of claim 1, further comprising:
determining the drive signal by repeatedly varying a current to the Helmholtz coil so as to establish upper and lower values of the current that provide a usable value of the first signal.

3. The method of claim 1, further comprising:
detecting a drift in the Earth magnetic field by monitoring a low-pass filtered version of the first signal.

4. The method of claim 3, further comprising:
upon detecting the drift has exceeded a predetermined amount, adjusting the drive signal by a scaling factor times the drift.

5. The method of claim 1, wherein the first magnetometer is substantially surrounded by a first wellbore, further comprising:
determining the range to the sub-surface object as approximately the range from the first magnetometer to a well casing installed in a second wellbore that is different from the first wellbore.

6. The method of claim 1, further comprising:
receiving the first signal from a down hole telemetry transmitter during the down hole drilling operations.

7. The method of claim 1, further comprising:
circulating current associated with the first signal around the first magnetometer.

8. The method of claim 1, further comprising:
concentrating current associated with the first signal in a path by providing the path as one of increased conductivity relative to a ferrous housing surrounding the first magnetometer.

9. The method of claim 1, further comprising:
shielding the first magnetometer with a magnetic shielding material in substantially all directions that are not aligned with a sense axis of the first magnetometer.

10. The method of claim 1, wherein acquiring the first signal further comprises:
acquiring the first signal from the first magnetometer when the first magnetometer is disposed within a drill collar.

11. An apparatus, comprising:
a first magnetometer at least partially disposed within a Helmholtz coil;
a second magnetometer having a sensitivity at least one thousand times less than the first magnetometer; and
a signal processor configured to drive the Helmholtz coil according to a signal provided by the second magnetometer so as to substantially null an ambient Earth magnetic field surrounding the first magnetometer, and to receive a down hole location signal or a down hole telemetry signal from the first magnetometer.

12. The apparatus of claim 11, wherein the first magnetometer comprises:
at least one of a Rb magnetometer or a diamond magnetometer.

13. The apparatus of claim 11, wherein the second magnetometer comprises:
a flux gate magnetometer.

14. The apparatus of claim 11, wherein the Helmholtz coil and the second magnetometer comprise:
three-axis units substantially aligned along the three axes.

15. The apparatus of claim 11, wherein the Helmholtz coil and the first magnetometer comprise:
single-axis units substantially aligned along the single axis.

16. The apparatus of claim 11, further comprising:
a low pass filter coupled to an output of the first magnetometer, the low pass filter to provide a drift monitoring output associated with the Earth magnetic field.

17. The apparatus of claim 11, further comprising:
a magnetically-permeable shield substantially surrounding the first magnetometer, with an opening substantially aligned with a sense axis of the first magnetometer.

18. A system, comprising:
a down hole tool housing; and
an apparatus attached to the housing, the apparatus comprising a first magnetometer at least partially disposed within a Helmholtz coil, a second magnetometer having a sensitivity at least one thousand times less than the first magnetometer, and a signal processor configured to drive the Helmholtz coil according to a signal provided by the second magnetometer so as to substantially null an ambient Earth magnetic field surrounding the first magnetometer, and to receive a down hole location signal or a down hole telemetry signal from the first magnetometer.

19. The system of claim 18, wherein the housing comprises:
one of a wireline tool body, a measurement while drilling down hole tool, or a logging while drilling down hole tool.

20. The system of claim 18, wherein the down hole tool housing has a plurality of longitudinal channels around an outer perimeter, and wherein the first magnetometer is disposed within a covered one of the channels, along with a copper bar attached to the down hole tool housing.

21. The system of claim 18, further comprising:
an insulating gap in a drill collar of the down hole tool housing, the insulating gap proximate to the first or the second magnetometer.

\* \* \* \* \*